United States Patent
Greber

(10) Patent No.: US 9,346,017 B2
(45) Date of Patent: *May 24, 2016

(54) EXHAUST LINE WITH DEVICE FOR INJECTING GASEOUS REAGENT

(75) Inventor: Frederic Greber, Ecot (FR)

(73) Assignee: Faurecia Systemes D'Echappement, Nanterre (FR)

( * ) Notice: Subject to any disclaimer, the term of this patent is extended or adjusted under 35 U.S.C. 154(b) by 268 days.

This patent is subject to a terminal disclaimer.

(21) Appl. No.: 13/991,666

(22) PCT Filed: Dec. 15, 2010

(86) PCT No.: PCT/FR2010/052751
§ 371 (c)(1),
(2), (4) Date: Nov. 4, 2013

(87) PCT Pub. No.: WO2012/080585
PCT Pub. Date: Jun. 21, 2012

(65) Prior Publication Data
US 2014/0044603 A1    Feb. 13, 2014

(51) Int. Cl.
*B01D 50/00* (2006.01)
*B01D 53/94* (2006.01)
*F01N 3/20* (2006.01)
*F01N 3/28* (2006.01)
*F01N 13/00* (2010.01)

(52) U.S. Cl.
CPC .............. *B01D 53/94* (2013.01); *F01N 3/2066* (2013.01); *F01N 3/2892* (2013.01); *F01N 13/0097* (2014.06); *F01N 2240/20* (2013.01); *F01N 2610/02* (2013.01); *Y02T 10/24* (2013.01)

(58) Field of Classification Search
CPC ... F01N 3/2066; F01N 2240/20; B01D 53/94; Y02T 10/24
USPC ......................................................... 422/171
See application file for complete search history.

(56) References Cited

U.S. PATENT DOCUMENTS

| | | | |
|---|---|---|---|
| 6,449,947 B1* | 9/2002 | Liu | B01D 53/9431 60/286 |
| 6,722,124 B2* | 4/2004 | Pawson | B01D 53/9431 422/172 |
| 8,539,761 B2* | 9/2013 | Lebas | B01F 3/04049 366/338 |
| 9,174,167 B2* | 11/2015 | Kelso | F01N 5/04 |
| 2003/0079467 A1* | 5/2003 | Liu | B01D 53/9431 60/286 |
| 2007/0144158 A1* | 6/2007 | Girard | F01N 3/2892 60/324 |
| 2009/0019842 A1 | 1/2009 | Suzuki | |
| 2010/0083643 A1 | 4/2010 | Hayashi | |

FOREIGN PATENT DOCUMENTS

| | | | |
|---|---|---|---|
| EP | 2019190 A1 | 1/2009 | |
| WO | 2008115841 A1 | 9/2008 | |
| WO | 2010146285 A1 | 12/2010 | |

OTHER PUBLICATIONS

Search Report from corresponding PCT Application No. PCT/FR2010/052751, published as WO/2012/080585A1 on Jun. 21, 2012 (Date of Search Report Sep. 12, 2011).

* cited by examiner

Primary Examiner — Tom P Duong
(74) Attorney, Agent, or Firm — Carlson, Gaskey & Olds, PC

(57) ABSTRACT

An exhaust line of a motor vehicle includes an upstream monolith and a downstream monolith for treating exhaust gases passing along the exhaust line. The upstream and downstream monoliths are positioned in series. An injection portion is positioned between an upstream face defined by the upstream monolith and a downstream face defined by the downstream monolith and includes a duct through which a stream of exhaust gas flows. The duct extends from the upstream face to the downstream face and has a central line of a set length between the faces. A reagent injector is mounted on the injection portion and is designed to inject reagent in gaseous form into the injection portion. At least one cup is positioned inside the duct in the path of the exhaust gas stream so that a mean path of the exhaust gas stream line is at least 20% longer than the set length.

28 Claims, 11 Drawing Sheets

EXHAUST LINE WITH DEVICE FOR INJECTING GASEOUS REAGENT

TECHNICAL FIELD

The present invention generally relates to exhaust lines for motor vehicles equipped with devices for injecting a reducing gas for a selective reduction catalyst of the exhaust gases of an engine.

More specifically, the invention relates to an exhaust line for a motor vehicle that includes an upstream monolith and a downstream monolith, for treating the exhaust gases passing along the exhaust line, with the upstream and downstream monoliths being positioned in series in the exhaust line. An injection portion is positioned between an upstream face defined by the upstream monolith and a downstream face defined by the downstream monolith, and comprises a duct through which a stream of exhaust gas flows. The duct extends from the upstream face to the downstream face, and has a central line with a set length between the upstream and downstream faces, An injection device comprises a reagent injector mounted on the injection portion and is designed to inject the reagent in gaseous form into the injection portion. Such an exhaust line is provided to equip an internal combustion engine, for example a diesel engine.

BACKGROUND

Exhaust lines are known that include a reduction system for nitrogen oxides and a device for injecting a reducing agent, such as urea, placed upstream from that system. The most widespread configuration of the urea injection areas is generally situated between a particle filter (preceded by an oxidation catalyst) upstream from a selective catalytic reducer (SCR) of the nitrogen oxides downstream. Another relatively widespread solution consists of placing the injection area between the oxidation catalyst and either a particle filter that is impregnated to treat the reduction of the nitrogen oxides, or an SCR catalyst followed by a traditional particle filter.

However, in both cases, the current injection areas comprise, from the outlet face of the upstream monolith (which is either a particle filter or an oxidation catalyst) as far as the inlet face of the following monolith (which is either an SCR catalyst, or an SCR impregnated particle filter, or an SCR catalyst followed by a standard particle filter): a convergent cone that reduces the passage diameter of the gases, a tube supporting the injector, and a divergent inlet cone that increases the passage diameter of the gases. Furthermore, in most cases, the injection areas comprise a mixer inside the tube after the support for the injector.

Such an arrangement requires an incompressible length in particular due to the presence of the convergent and divergent cones. Furthermore, to ensure correct operation of the urea injection system, it is necessary for the injection, evaporation, hydrolysis-thermolysis of the urea into ammonia, and mixing of the ammonia with exhaust gases functions to be performed in order to obtain a very homogenous dispersion of the ammonia in the exhaust gases on the inlet face of the downstream monolith. This conversion of the urea into ammonia and mixing between the ammonia and the exhaust gases requires time, and consequently a significant travel distance.

Overall, optimizing the various functions as much as possible, the distance between the two monoliths may be reduced to 200 mm. However, such an arrangement with a reduced distance is delicate and costly to produce.

Certain exhaust lines are equipped with devices for injecting ammonia in gaseous form, replacing the injection of urea. The portion for injecting gaseous ammonia can be situated between the two monoliths, which also requires an incompressible length between the monoliths. In any case, this length must allow good mixing between the injected ammonia and the exhaust gases.

SUMMARY

In that context, an exhaust line is provided whereof the operation is more satisfactory, with a reduced bulk and that is less expensive to produce.

An exhaust line of the aforementioned type, includes an injection portion that comprises at least one first cup positioned inside the duct in the path of the exhaust gas stream so that a mean path of the exhaust gas stream line is at least 20% longer than the set length. The injection portion includes a second cup positioned inside the circulation duct between the upstream face and the first cup. The injection of the reagent is done between the first cup and the second cup.

The exhaust line may include one or more of the following features, considered individually or according to any technically possible combinations:

- the set length is substantially comprised between 40 and 140 mm;
- the first cup has a bottom wound in a spiral around the central line of the injection portion;
- the bottom of the first cup is wound in a spiral around the central line of the injection portion for performing three quarters of a revolution;
- the first cup has an opening at the end of the spiral furthest from the upstream face;
- the first cup includes a beak at the end of the spiral furthest from the upstream face;
- the beak extends the bottom of the first cup toward the upstream face and toward the outside of the spiral;
- the second cup has a bottom winding in a spiral around the central line of the injection portion;
- the second cup has an opening at the end of the spiral furthest from the upstream face;
- the second cup has an opening at the end of the spiral closest to the upstream face;
- the first and second cups define a spiral-shaped conduit between them, starting from the opening of the second cup and going to the opening of the first cup, extending over at least 180°, preferably 275°, and having a straight cross-section substantially larger than 2,300 mm$^2$;
- the first cup includes a rounded wall having a central area protruding toward the upstream face and a hollow peripheral area turned toward the upstream face surrounding the protruding central area, an opening being formed in the wall of the first cup between the protruding central area and the hollow peripheral area;
- the second cup includes a rounded wall having a hollow central area turned toward the upstream face and a peripheral area protruding toward the upstream face surrounding the hollow central area, an opening being formed in the wall of the second cup between the hollow central area and the protruding peripheral area;
- the first and second cups are configured to impart a helical movement to the exhaust gases from the opening of the second cup to the opening of the first cup;
- the opening of the first cup and the opening of the second cup are angularly offset relative to one another around the central line;
- the second cup has perforations with a diameter substantially equal to 5 mm or an opening;

the first cup comprises a wire mesh layer over at least part of its surface;

the reagent injector is oriented such that the injection direction is perpendicular to the injection portion; and the reagent injector is oriented such that the injection direction is parallel to the tangent to the injection portion.

These and other features may be best understood from the following drawings and specification.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

In the following description, upstream and downstream will be understood relative to the normal direction of travel of the exhaust gases along the exhaust line, indicated by the arrows in the figures.

Figure 1:
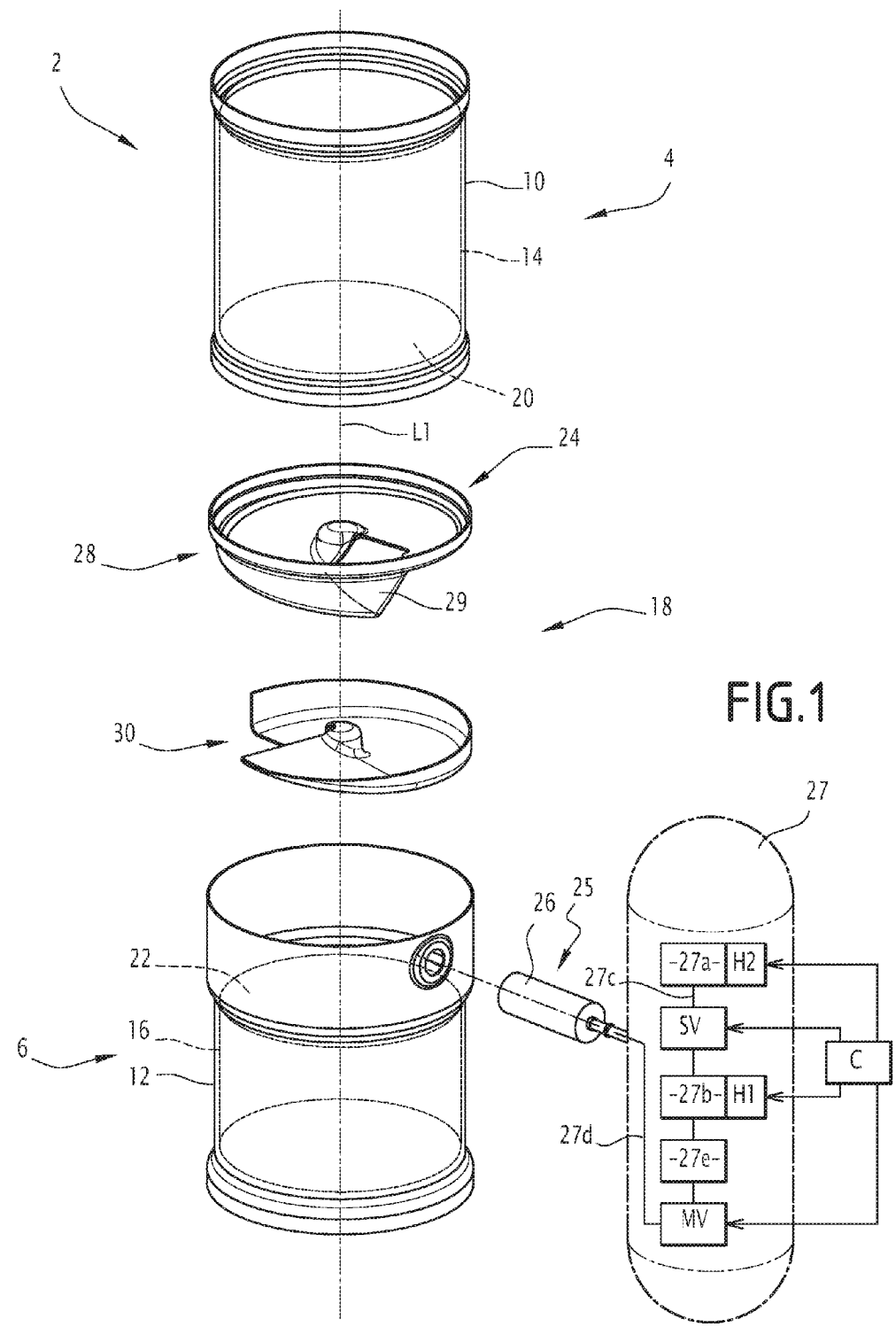
FIG. 1 is an exploded perspective view of the exhaust line according to one embodiment of the invention.

The exhaust line 2 partially shown in FIG. 1 is provided to be mounted on a motor vehicle equipped with an internal combustion engine, for example a diesel engine. The exhaust line 2 includes two devices 4, 6 for treating exhaust gases. Each exhaust gas treatment device 4, 6 comprises an outer enclosure 10, 12 and a monolith 14, 16 positioned inside the enclosure 10, 12.

For example, the upstream device 14 for treating exhaust gases is a particle filter or an oxidation catalyst, and the downstream device 16 for treating exhaust gases is an SCR catalyst, or an SCR impregnated particle filter, or an SCR catalyst followed by a standard particle filter.

The monolith of an oxidation or SCR catalyst, for example, comprises a structure that is permeable to the gases and that is covered with catalytic metals favoring the oxidation of the combustion gases and/or the reduction of the nitrogen oxides.

The monolith of a particle filter is suitable for retaining the soot particles emitted by the engine and optionally for binding the gaseous pollutants.

The exhaust line 2 also includes an injection portion 18 positioned between an upstream face 20 defined by the upstream monolith 14 and a downstream face 22 defined by the downstream monolith 16. The upstream face 20 is the face through which the exhaust gases leave the upstream monolith 14 and the downstream face 22 is the face through which the exhaust gases enter the downstream monolith 16.

The injection portion 18 comprises a duct 24 allowing a stream of exhaust gas to pass from the upstream face 20 to the downstream face 22.

The exhaust line 2 also comprises an injection device 25, which in turn includes a reagent injector 26 mounted on the injection portion 18 and provided to inject a reagent in gaseous form into the injection portion 18, and a store 27 provided to supply the injector 26 with reagent in gaseous form.

The duct 24 has a central line L1 having a set length between the upstream 20 and downstream 22 faces. The central line L1 is the line passing through the geometric centers of the straight cross-sections of the duct 24. In the illustrated example, it is the straight line parallel to the axis of the upstream and downstream monoliths. It is perpendicular to the upstream 20 and downstream 22 faces and passes through their centers.

The injection portion 18 includes a cup 28 positioned inside the duct 24 in the path of the exhaust gas stream. That cup 28 is called a weir. The weir 28 has a bottom winding in a spiral around the central line of the injection portion and a large opening 29 at the end of the spiral furthest from the upstream face 20. The opening 29 is inclined both relative to the central line L1 and relative to a plane perpendicular to the central line L1.

The diameter of the cup 28 is equal to the inner diameter of the exhaust gas ducts. It extends in the entire straight cross-section of the duct 24. The peripheral edge of the cup 28 bears against the inner surface of the duct 24.

The spiral shape of the weir 28 initiates the rotary movement of the exhaust gases, the only way out being downstream. The exhaust gases perform approximately one complete revolution.

The uppermost part of the weir 28 is approximately 6 mm from the outlet face 20 of the upstream monolith 14. According to one alternative, this distance may be increased up to 10 mm to avoid excessively increasing the back pressure.

Furthermore, the injection portion 18 includes a second cup 30, called a "channel," positioned inside the duct 24 between the first cup 28 and the downstream face 22, the second cup 30 having a bottom winding in a spiral around the central line L1 of the injection portion.

Preferably, the bottom of the second cup 30 winds in a spiral around the central line L1 of the injection portion while performing three quarters of a revolution.

The second cup 30 has an opening at the end of the spiral furthest from the upstream face 20. That opening is limited by the two end edges of the spiral-shaped bottom of the second cup 30 and the wall of the duct 24.

The diameter of the second cup 30 is equal to the inner diameter of the exhaust gas duct. It extends in the entire straight cross-section of the duct 24, the peripheral edge of the cup 30 bearing against the inner surface of the duct 24.

The two cups 28, 30 define a spiral-shaped conduit between them, going from the opening 29 of the weir 28 to the opening of the cup 30 and extending over at least 180°, preferably 275°. The spiral-shaped conduit is laterally limited by the inner surface of the duct 24.

The spiral-shaped conduit and the openings of the cups offer the exhaust gases a cross-section substantially greater than 2,300 mm$^2$, and preferably at least 2,375 mm$^2$. This cross-section corresponds to a section of a tube with a diameter of 55 mm, commonly used in exhaust lines and in particular in the injection area.

The opening of the first cup 28 and the opening of the second cup 30 are angularly offset relative to one another around the central line L1, to prevent any direct path parallel to the central line L1 of the injection portion 18 of the exhaust gas stream.

The injection portion 18 has a cylindrical side wall with a diameter of approximately 150 mm, i.e., substantially equal to the diameters of the gas treatment devices, and a length comprised between 40 and 140 mm. Preferably, the distance between the upstream face 20 of the upstream monolith 14 and the downstream face 22 of the downstream monolith 16 is comprised between 60 and 100 mm.

The side wall is integral with the outer enclosure 12 surrounding the downstream monolith 16.

The two cups 28, 30 are fixed to the side wall, for example, by welds.

The side wall comprises an opening intended to insert and fasten the injector for the reagent, here gaseous ammonia, to the wall between the first cup 28 and the second cup 30.

The injection device 25 is provided to inject a gaseous reagent such as gaseous ammonia. It is, for example, of the type described in patent application WO2008/077652. The gaseous reagent may be another reducer.

The device 25 includes a store 27 of ammonia provided to supply a metered flow of gaseous ammonia to the injector 26. The store 27 is shown symbolically in FIG. 1. The store 27 typically includes a primary storage reservoir 27a for the ammonia, an operational storage reservoir 27b for ammonia, a first line 27c connecting the primary reservoir 27a to the operational reservoir 27b, a shut-off valve SV inserted on the first line 27c, a second line 27d connecting the operational reservoir 27b to the injector 26, and a metering valve MV inserted on the second line 27d.

The primary reservoir 27a and the operational reservoir 27b each contain a material capable of selectively absorbing or adsorbing gaseous ammonia, and desorbing the gaseous ammonia, hereafter called ammonia storage material.

The operational reservoir 27b, for example, contains Mg(NH3)6C12. The primary reservoir 27a, for example, contains Sr(NH3)8C12 or Ca(NH3)8C12.

The operational reservoir 27b is equipped with a H1 heater for heating the ammonia storage material. When the heating is initiated, the gaseous ammonia is desorbed from the storage material and flows to the injector 26, under the effect of gas pressure inside the operational reservoir 27b. When the heating is stopped, the gaseous ammonia is absorbed or adsorbed by the storage material.

The primary reservoir 27a is preferably also equipped with a heater H2 for heating the ammonia storage material. The function of the primary reservoir 27a is to resupply the operational reservoir 27b with ammonia when the latter is empty or nearly empty.

A buffer reservoir 27e may be inserted on the second line 27d upstream from the metering valve MV. The metering valve MV is piloted by a computer C to regulate the gaseous ammonia pressure upstream from the metering valve MV and the gaseous ammonia flow rate injected into the injection portion. The computer C also pilots the heater H1 of the operational reservoir 27b to that end.

Furthermore, the computer C pilots the heater H2 of the primary reservoir 27a and the shutoff valve SV.

The injector 26 is of any type suitable for injecting gaseous ammonia into the injection portion. The injector 26 may be a simple tube emerging in the injection portion 18. It is, for example, oriented such that the injection direction is perpendicular to the side wall of the injection portion 18.

According to one alternative, the injector 26 is oriented such that the injection direction has an angle comprised between 40° and 45° relative to the tangent to the side wall to make the jet co-current with the exhaust gas.

Figure 3:
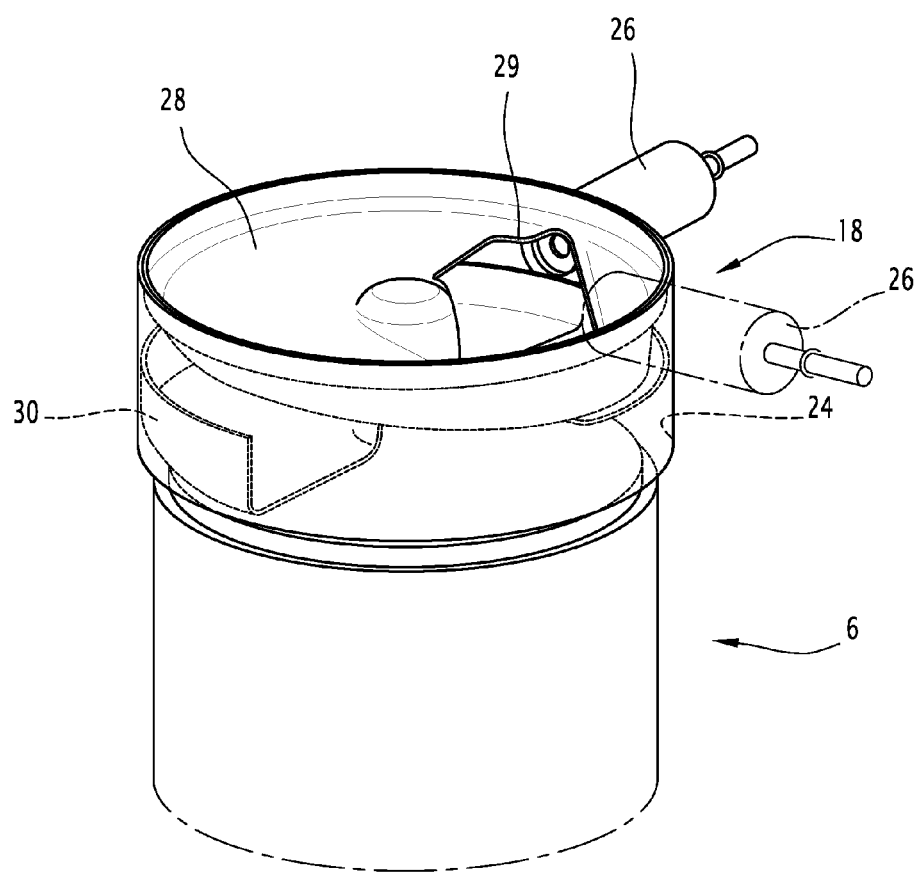
FIG. 3 is a compact perspective view of the exhaust line of FIG. 1.

According to another alternative shown in mixed lines in FIG. 3, the injector 26 is oriented such that the injection direction is parallel to the tangent to the side wall, thereby making it possible to obtain a more compact injection portion 18.

Alternatively, the store 27 may include a heating reactor charged with a material such as ammonium carbamate or urea, or another ammonia precursor.

Such stores are described in US 2006/0117741, U.S. Pat. No. 6,301,879 and U.S. Pat. No. 6,399,034. When these materials are heated, they break down while producing gaseous ammonia, which supplies the injector 26.

According to another alternative, the gaseous ammonia can be stored under pressure in the store 27.

Figure 2:
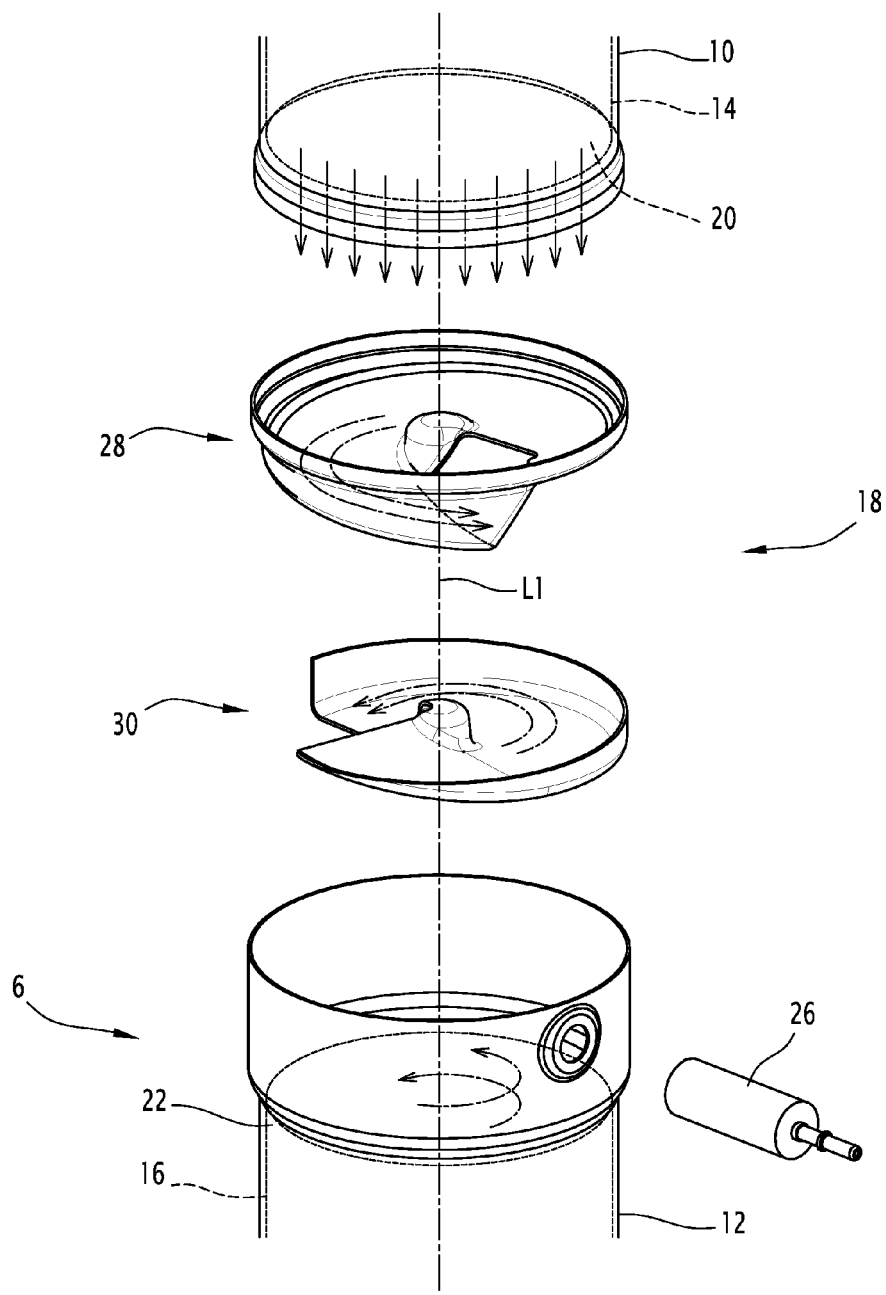
FIG. 2 is an exploded perspective view of the exhaust line of FIG. 1 illustrating its operation.

The operation of the exhaust line described above will now be outlined, in light of FIG. 2, in which exhaust gas stream lines are illustrated.

After having passed through the upstream monolith 14, the exhaust gases leave the upstream monolith 14 with a substantially uniform distribution. The exhaust gas stream is laminar and substantially parallel to the central line L1. The exhaust gases arrive on the first cup 28. The travel of the gases parallel to the central line L1 is blocked by the first cup 28, the spiral shape of which initiates the rotary movement of the gases.

The gases then enter the second cup/channel 30, the spiral shape of which maintains the rotary movement of the exhaust gases.

At the outlet of the first cup 28 or weir, the gaseous ammonia is injected into the upstream portion of the channel 30. The mixing between the gaseous ammonia and the exhaust gases occurs during the passage of the gases in the channel 30, i.e., during the time necessary for the gas to perform three quarters of revolution. The mean distance traveled by the exhaust gases during those three quarters of a revolution is approximately 180 mm. That distance is suitable to allow excellent dispersion of the gaseous ammonia in the exhaust gases, the ammonia and the exhaust gases thereby forming a homogenous mixture.

Once the gases have reached the opening or outlet of the channel 30, they pass through the downstream monolith 16.

The gases that reach this stage have on average already performed slightly more than one revolution; they have therefore acquired a significant tangential velocity and "attack" the downstream surface 22 or inlet surface of the monolith 16 along that component. It is known that this manner of arriving on the monolith favors the obtainment of a good, uniform distribution on the surface of the monolith.

The injection portion 18 typically has a length of only 60 mm and a diameter of 150 mm, i.e., the diameter of the outer enclosures surrounding the upstream and downstream monoliths. Thus, as illustrated in FIG. 3, the injection portion is contained in a cylinder with a diameter of 60×150 mm and makes it possible to increase the mean path of the exhaust gas stream lines by at least 20% relative to the set length between the upstream face 20 and the downstream face 22.

Furthermore, if the gas flow rate is different from the example cited above, then the length of the cylinder will be different to form a necessary passage section. If the flow rate is higher, then the distance between the two monoliths will need to be increased. If it is lower, that distance will then be able to be decreased.

This embodiment can be used in a horizontal or vertical portion, under a floor or under a manifold (in the close position) of a motor vehicle.

Figure 4:
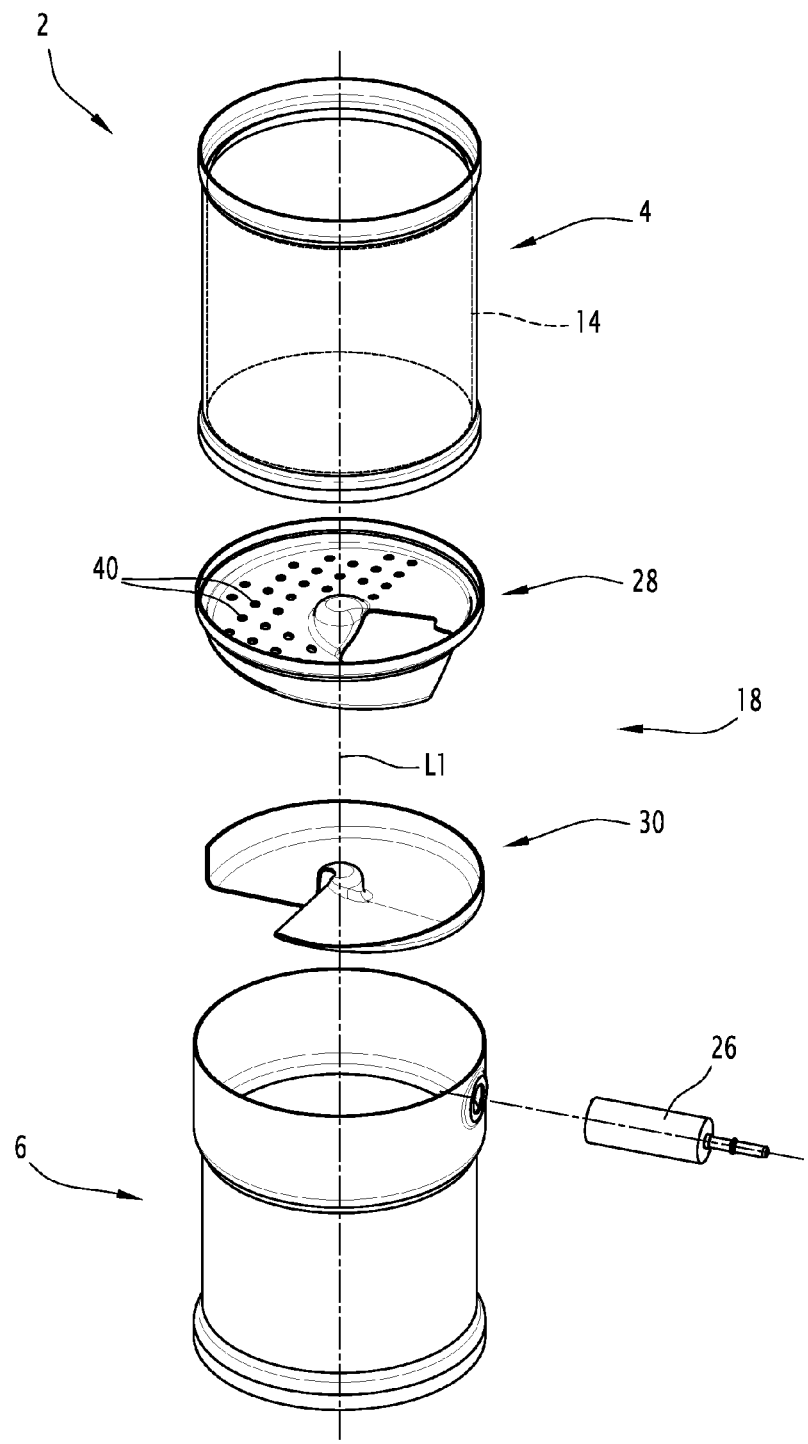
FIG. 4 is an exploded view of the exhaust line of FIG. 1 provided with a device for homogenizing the gas/ammonia mixture.

To ensure optimal homogenization, as shown in FIG. 4, the first cup 28 includes perforations 40 with a diameter substantially equal to 5 mm.

For example, if the jet of gaseous ammonia penetrating the injection portion has little energy, it will not penetrate the gaseous stream deeply. The concentration of ammonia on the outer edge of the channel 30 will therefore be greater than the concentration at the center. The presence of perforations 40 of the weir 28 above the outer edge of the channel 30 will allow the gas leaving the upstream monolith 14 to short-circuit the inlet of the channel 30 and deplete the ammonia/air ratio at the periphery of the channel 30.

Conversely, if the characteristics of the injection device 25 are such that a large portion of the ammonia is located inside, in the central portion, of the channel 30, the perforations 40 will overhang that area.

Figure 5:
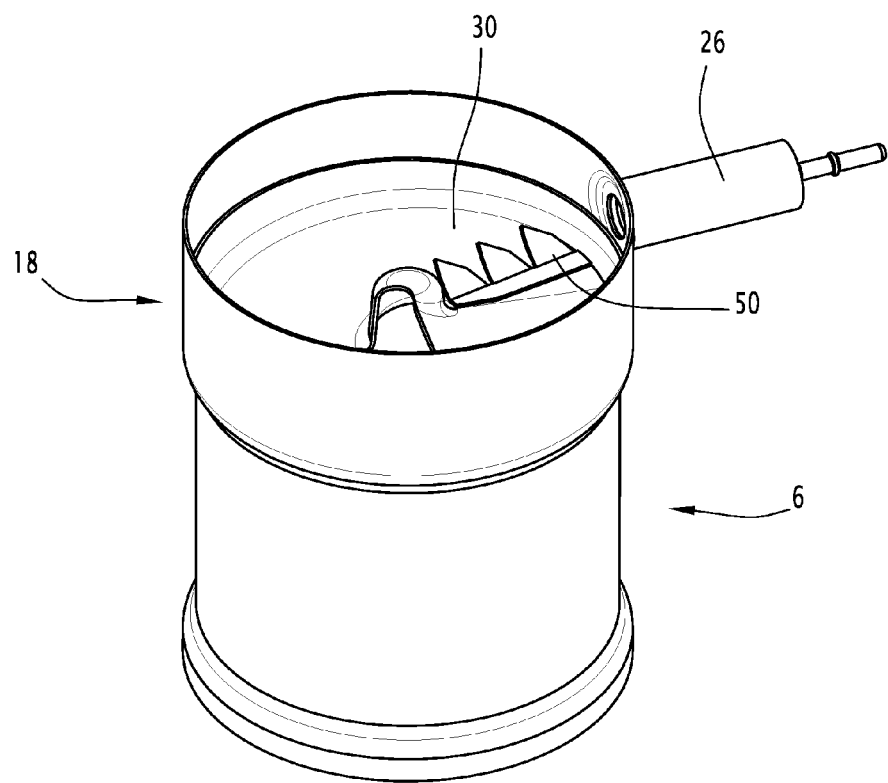
FIG. 5 is a perspective view of an injection portion with a liner mixer.
Figure 6:
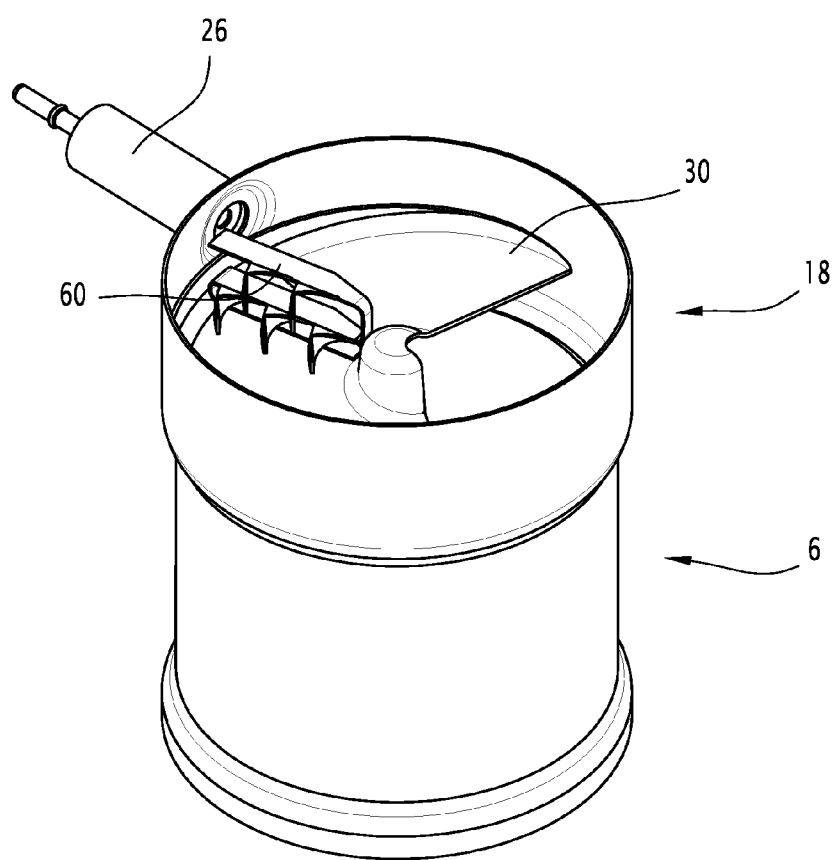
FIG. 6 is a perspective view of another example of an injection portion with a linear mixer.

In one alternative illustrated in FIGS. 5 and 6, the injection portion 18 includes a linear mixer situated between the two cups to create obstacles that aim to disrupt the stream to homogenize the exhaust gases and the ammonia. This mixer may assume the form of fins 50 or raised tongues fastened on the second cup 30 and oriented toward the first cup 28 (not shown here) as shown in FIG. 5, or a helical shape 60 as shown in FIG. 6.

Figure 7:
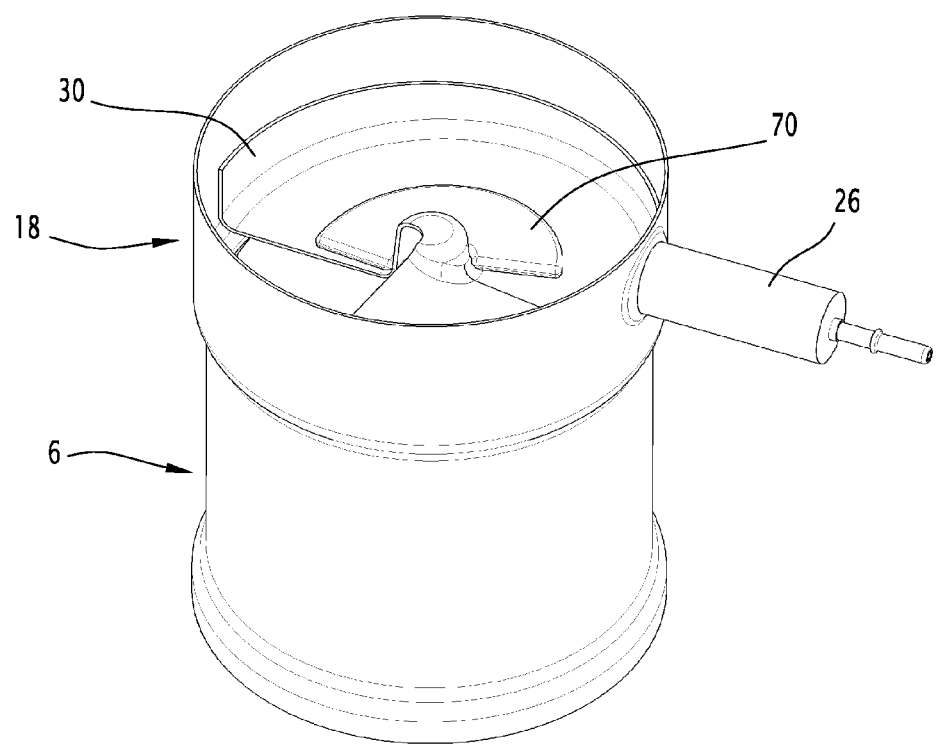
FIG. 7 is a perspective view of an injection portion including a second cup with wire mesh.

According to another alternative shown in FIG. 7, the second cup 30 includes a wire mesh layer 70 positioned on at least part of the surface of the second cup 30. Positioning the second cup 30 independently of the other pieces making up the injection portion 18 before assembly makes it possible to deposit a wire mesh layer 70 in certain locations. In fact, it is very difficult to deposit a wire mesh layer 70 in an exhaust tube.

In FIG. 7, the portion of the channel 30 covered by the wire mesh 70 is hotter than an outer wall.

It is also possible to fix a wire mesh layer 70 on the lower portion of the first cup 28 (not shown here) across from the second cup 30.

It is understood that the injection portion 18 may include one or more of these alternatives designed to obtain optimal homogenization of the gas/ammonia mixture, considered individually or according to all technically possible combinations.

Figure 8:
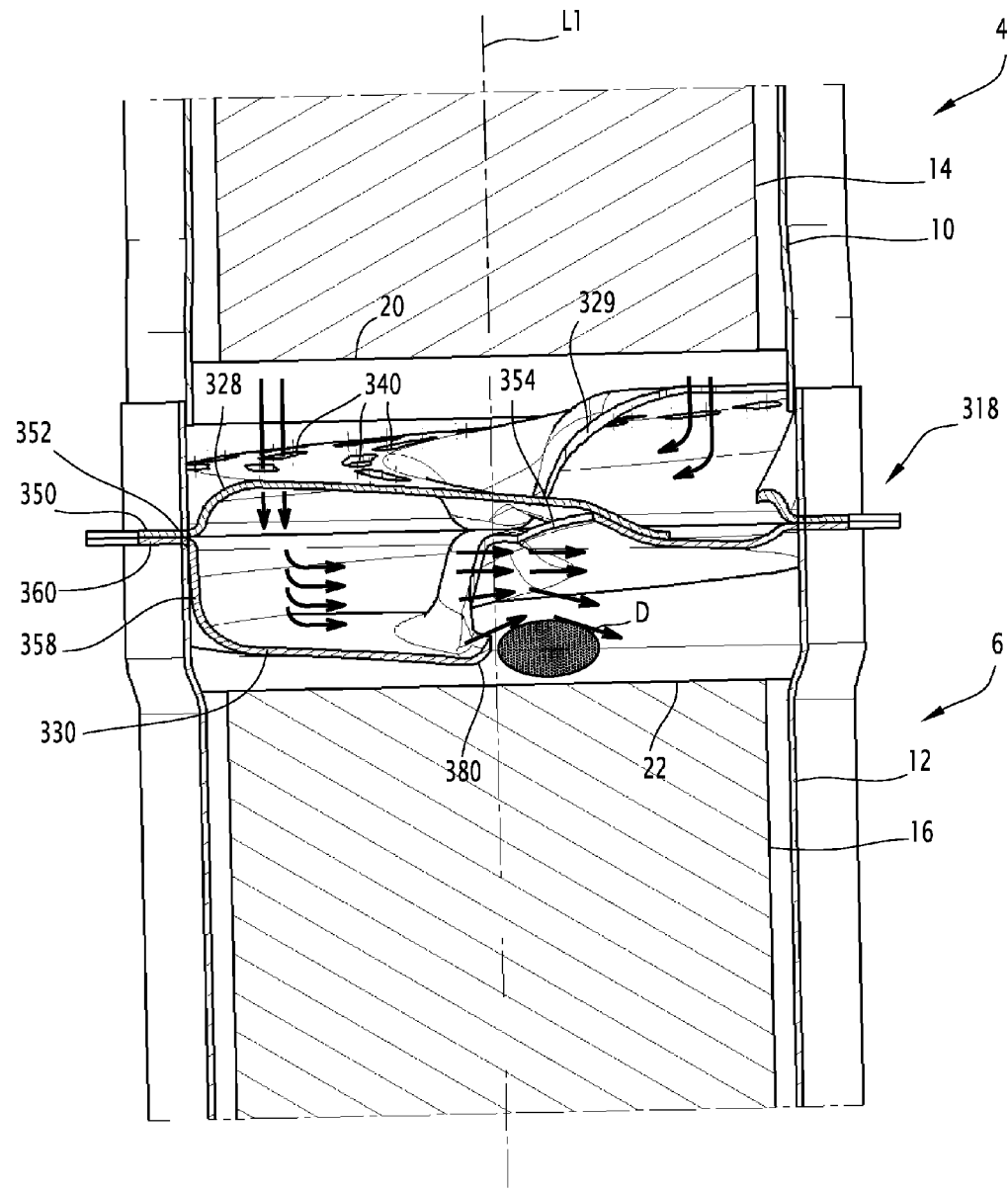
FIG. 8 is a profile view of a second embodiment of the exhaust line according to the invention.

A second embodiment of the injection portion 318 is illustrated in FIGS. 8 (profile view), 9 and 10 (perspective views). The injection portion 318 comprises a first cup 328 and a second cup 330.

The outer enclosure 12 of the downstream device 6 for treating the exhaust gases is fastened, sealed against the exhaust gases, to the lower portion of the outer enclosure 10 of the upstream device 4 for treating the exhaust gases. The downstream monolith 16 and the two cups 328, 330 are inside the downstream outer enclosure 12.

The first cup 328 has a bottom winding in a spiral around the central line L1 of the injection portion 318. The first cup 328 has a concavity turned toward the downstream face 22, such that the bottom of the first cup 328 forms a lid of the second cup 330.

The first cup 328 has a large opening 329 at the end of the spiral closest to the upstream face 20. The opening 329 is inclined both relative to the central line L1 and relative to a plane perpendicular to the central line L1.

The first cup 328 has a peripheral rim 350 extending from the bottom of the first cup 328 and extending substantially perpendicular to the central line L1, the peripheral rim 350 passing through a peripheral lumen 352 formed in the upstream portion of the downstream outer enclosure 12. The peripheral rim 350 of the first cup 328 is fastened, sealed against the exhaust gases, to the downstream outer enclosure 12, for example, by welding.

The bottom of the first cup 328 also includes perforations 340 making it possible to ensure optimal homogenization of the exhaust gases.

The second cup 330 is positioned between the first cup 328 and the downstream face 22, the second cup 330 having a bottom winding in a spiral around the central line L1 of the injection portion 318.

Preferably, the bottom of the second cup 330 winds in a spiral around the central line L1 of the injection portion 318 while performing at least three quarters of a revolution.

Figure 9:
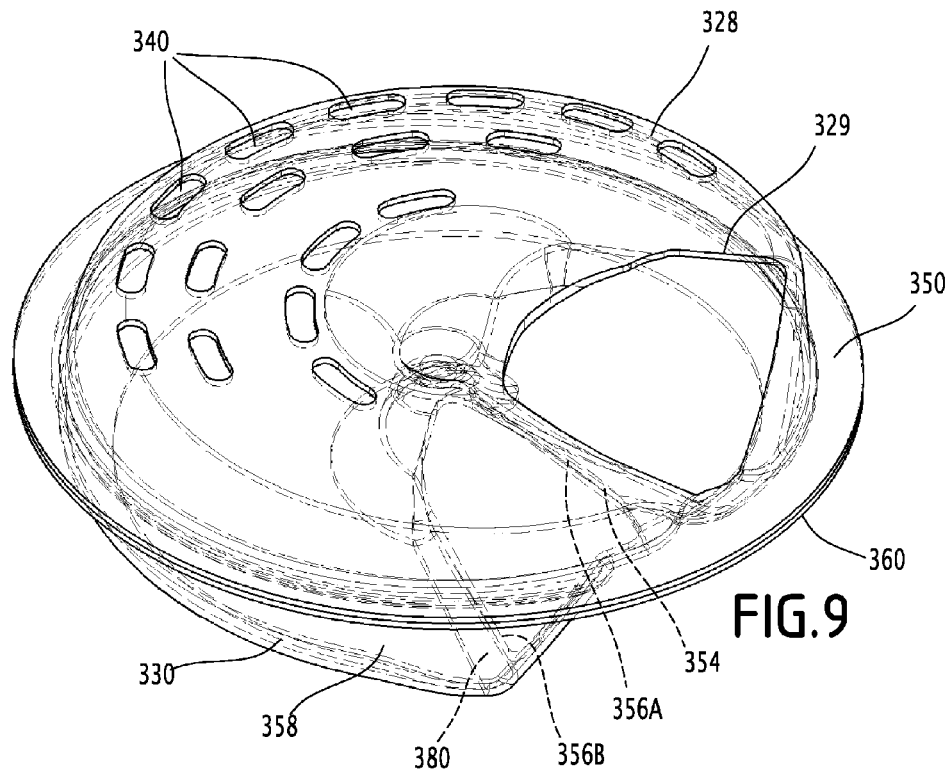
FIG. 9 is a perspective view of the cups of the second embodiment of the exhaust line of FIG. 8.
Figure 10:
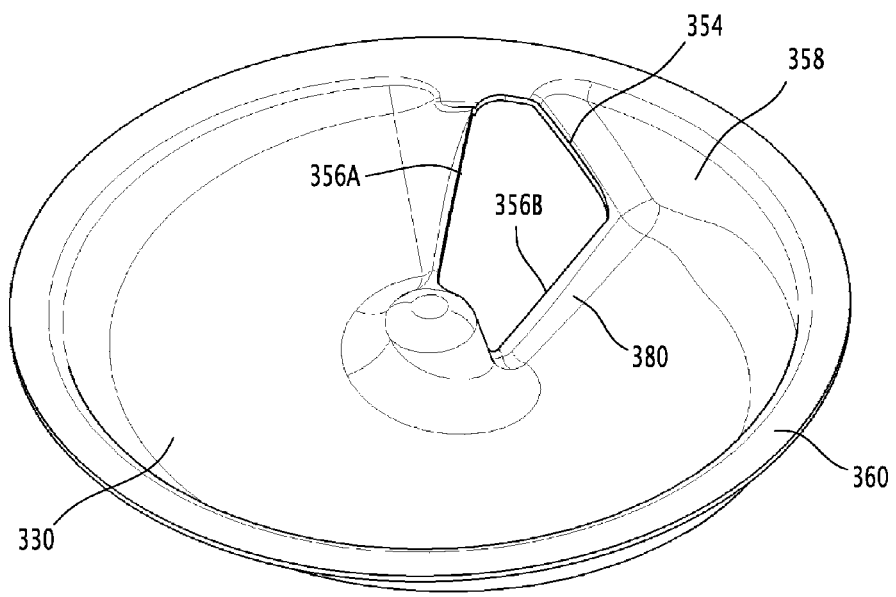
FIG. 10 is a perspective view of one of the cups of the second embodiment of the exhaust line of FIG. 8.

The second cup 330 has an opening 354 at the end of the spiral furthest from the upstream face 20. This opening 354 is limited by the two end edges 356A, 356B (FIG. 9) of the spiral-shaped bottom of the second cup 330 and by the peripheral wall 358 of the second cup 330, the peripheral wall 358 of the second cup 330 bearing against the inner surface of the duct.

The second cup 330 has a peripheral rim 360 extending from the peripheral wall 358 of the second cup 330 and extending substantially perpendicular to the central line L1, the peripheral rim 360 passing through the peripheral lumen 352 formed in the upstream portion of the downstream outer enclosure 12. The peripheral rim 360 of the second cup 330 is fastened, sealed against the exhaust gases, to the downstream outer enclosure 12, for example, by welding.

The peripheral rims 350, 360 of the first and second cups 328, 330 are thus positioned across from and in contact with each other, and are fastened to each other, sealed against the exhaust gases, for example, by welding.

The two cups 328, 330 define a spiral-shaped conduit between them, going from the opening 329 of the first cup 328 to the opening 354 of the second cup 330 and extending over at least 180°, preferably over at least 275°.

The second cup 330 also includes a beak 380 positioned at its downstream end, i.e., the end of the spiral furthest from the upstream face 20. The beak 380 extends the bottom of the second cup 330 toward the upstream face 20 and toward the outside of the spiral conduit, and is defined by the end edge 356B. The beak 380 thus forms a convex groove opening toward the upstream face 20.

As an example, the beak 380 has a curve radius of 5.5 mm and a height of 7 mm, the height of the beak 380 being able to be increased up to 10 mm. The beak 380 extends angularly over 10°, that value being able to be increased up to 90°.

The beak 380 makes it possible to limit the ammonia concentration just after the opening 354, as will be explained in more detail later.

The injector of the device for injecting gaseous reagent (not shown) is provided to inject into the spiral-shaped conduit defined by the two cups 328, 330. To that end, it is fastened on the bottom of the first cup 328, near the opening 329.

According to one alternative, the injector is fastened on the peripheral wall 358 of the second cup 330.

The operation of the exhaust line according to the second embodiment described above will now be outlined, in light of FIG. 8, in which the exhaust gas stream is shown by arrows.

As before, the exhaust gases arrive on the first cup 328. The gases are collected by the first cup 328 after having passed through the upstream monolith 14.

Then, the exhaust gases penetrate the spiral-shaped conduit through the opening 329 or through the perforations 340 and circulate in the spiral-shaped conduit as far as the opening 354.

At the inlet of the spiral-shaped conduit, the gaseous ammonia is injected and mixes with the exhaust gases during the passage of the exhaust gases in the spiral-shaped conduit.

At the outlet of the spiral-shaped conduit, the beak 380 forces the lower layer of exhaust gas, i.e., the layer of gas close to the second cup 330 and highly charged with ammonia, to change direction abruptly to be oriented upward, i.e., toward the upstream face 20, and to mix with the layer of gas situated just above it, that median layer being less charged with ammonia. The exhaust gases at the outlet of the second cup 330 then have a mean and homogenous ammonia concentration.

Furthermore, the sudden deviation of the lower layer of gas by the beak 380 creates a vacuum just at the outlet of the second cup 330, in the area referenced D in FIG. 8. This vacuum suctions the exhaust gases situated between the outlet of the second cup 330 and the downstream monolith 16, allowing better rotation of the exhaust gases on the downstream face 22.

As an example, in the case of an injection portion 318 with a diameter of 150 mm and 70 mm long, the uniformity index of the ammonia on the downstream face 22 is increased from 5 to 9 one hundredths.

Furthermore, as in the previous cases, the mixture may be integrated inside the spiral-shaped conduit and/or part of the walls of the spiral-shaped conduit may include a wire mesh to ensure optimal homogenization of the gases and the ammonia.

The advantage of this embodiment is that the distribution of the ammonia on the downstream face 22 of the downstream monolith 16 is improved, the ammonia thus being uniformly distributed in the downstream monolith 16.

Figure 11:
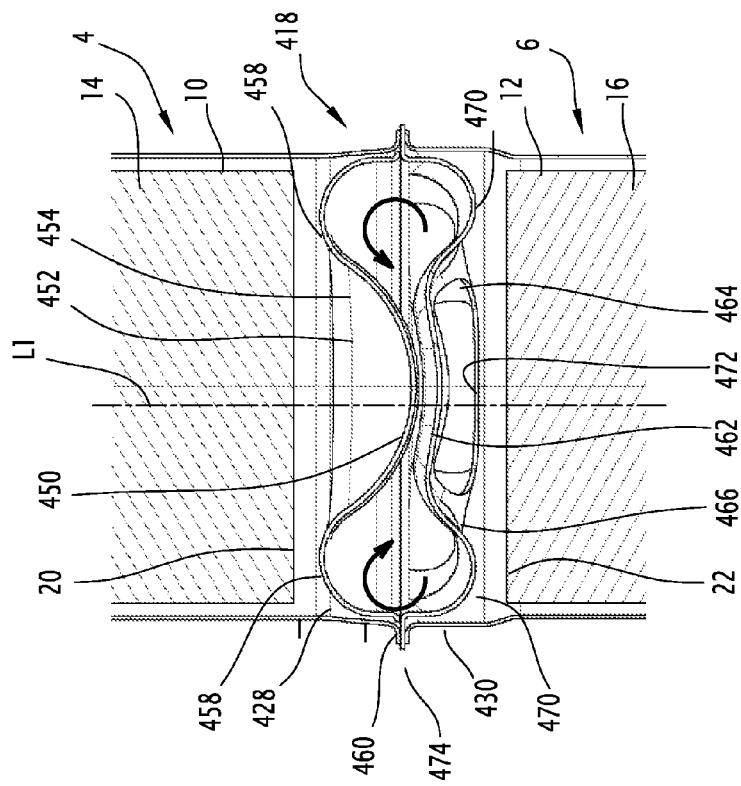
FIG. 11 is a profile view of a third embodiment of the exhaust line according to the invention.
Figure 12:
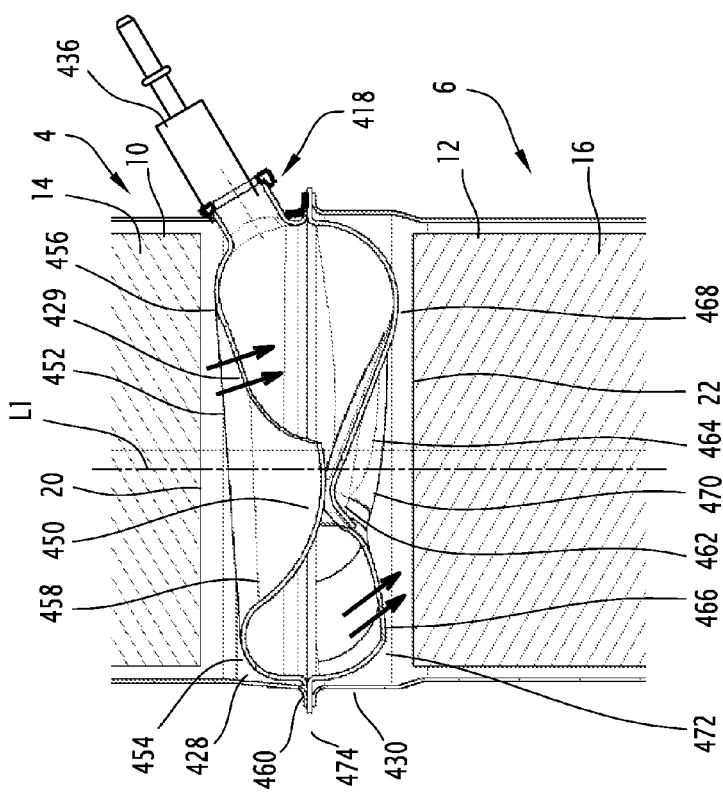
FIG. 12 is another profile view of the third embodiment of the exhaust line of FIG. 11.
Figure 13:
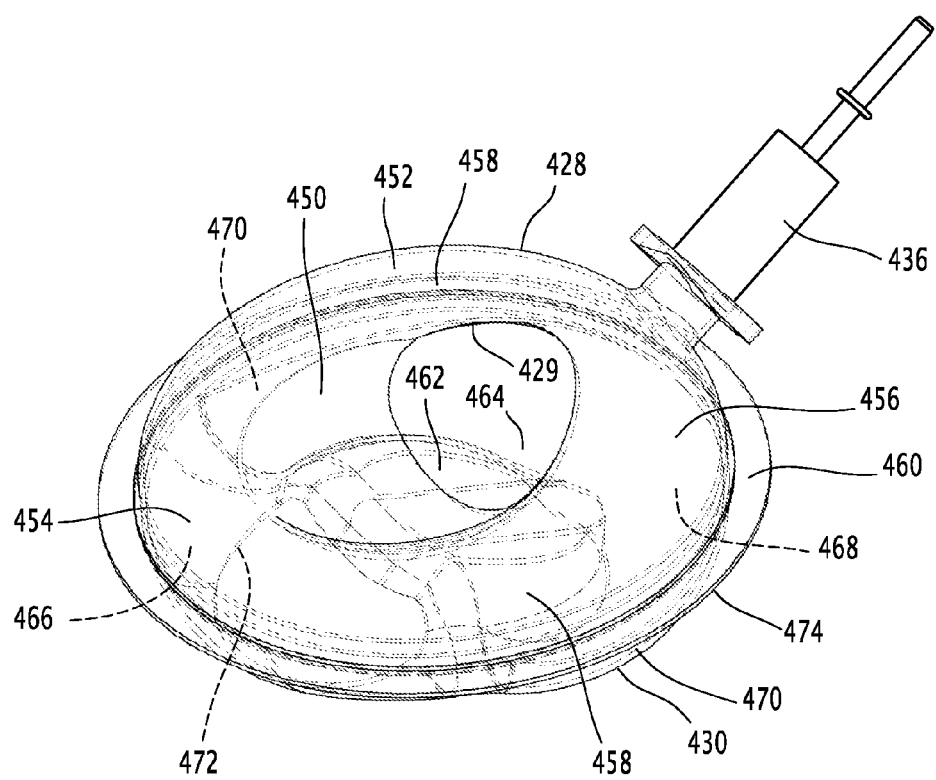
FIG. 13 is a perspective view of the cups of the third embodiment of the exhaust line of FIG. 11.

A third embodiment of the injection portion 418 is illustrated in FIGS. 11, 12 (profile views) and 13 (perspective view). The injection portion 418 comprises a first cup 428 and a second cup 430.

The outer enclosure 12 of the downstream device 6 for treating the exhaust gases is fastened, sealed against the exhaust gases, to the outer enclosure 10 of the upstream device 4 for treating the exhaust gases by the second cup 430. The two cups 428, 430 are arranged at the junction between the upstream 10 and downstream 12 outer enclosures, the first cup 428 being inside the upstream outer enclosure 10 and the second cup 430 being inside the downstream outer enclosure 12.

The first cup 428 opens toward the downstream face 22 and includes a rounded wall with no sharp edges. This wall has a hollow central area 450 turned toward the upstream face 20 and a peripheral area 452 protruding toward the upstream face 20 surrounding the hollow central area 450. The protruding peripheral area 452 comprises a lower peripheral portion 454 and an upper peripheral portion 456 opposite each other, the lower peripheral portion 454 having an axial height along the central line L1 that is reduced relative to that of the upper peripheral portion 456. The lower 454 and upper 456 peripheral portions are connected to each other by two opposite side peripheral portions 458.

The first cup 428 is symmetrical relative to the plane passing through the central line L1 of the injection portion 418 and the reagent injector 436 (FIG. 12).

A large opening 429 is formed in the wall of the first cup 428 between the hollow central area 450 and the upper peripheral portion 456 of the protruding peripheral area 452.

The opening 429 is inclined both relative to the central line L1 and relative to a plane perpendicular to the central line L1. The opening 429 has a substantially rounded triangular shape, one of the apices being located toward the injector 436.

The first cup 428 has a peripheral rib 460 extending the wall of the first cup 428 and extending substantially perpendicular to the central line L1. The peripheral rim 460 of the first cup 428 is fastened, sealed against the exhaust gases, to the second cup 430, for example, by welding.

The second cup 430 is positioned between the first cup 428 and the downstream face 22.

The second cup 430 opens toward the upstream face 20 and includes a rounded wall with no sharp edges. This wall has a central area 462 protruding toward the upstream face 20 and a hollow peripheral area 464 turned toward the upstream face 20 surrounding the central area 462. The hollow peripheral area 464 comprises a lower peripheral portion 466 and an upper peripheral portion 468 that are opposite each other, the lower peripheral portion 466 having an axial height along the central line L1 that is reduced relative to that of the upper peripheral portion 468. The lower 466 and upper 468 peripheral portions are connected to each other by two opposite peripheral side portions 470.

The second cup 430 is symmetrical relative to the plane passing through the central line L1 of the injection portion 418 and through the injector 436 of the device for injecting gaseous reagent (FIG. 12).

An opening 472 is formed in the wall of the second cup 430 between the central protruding area 462 and the lower peripheral portion 466 of the hollow peripheral area 464. The opening 472 is inclined relative to the central line L1 and relative to a plane perpendicular to the central line L1. The opening 472 is in the shape of a rounded crescent moon, the large side being located across from the injector 436.

The opening 429 of the first cup 428 and the opening 472 of the second cup 430 are angularly offset relative to each other around the central line L1 by substantially 180°.

According to one alternative, a second opening is provided in the wall of the first cup 428 between the hollow central area 450 and the lower peripheral portion 454 of the protruding peripheral area 452, opposite the injector 436 and substantially at the opening 472 of the second cup 430, to short-circuit the opening 429 so that part of the gases directly reach the opening 472 without passing through the duct, thereby decreasing the back pressure.

The second cup 430 has a peripheral rim 474 extending from the wall of the second cup 430 and extending substantially perpendicular to the central line L1. The peripheral rim 474 of the second cup 430 is fastened, sealed against the exhaust gases, to the upstream 10 and downstream 12 outer enclosures as well as the peripheral rim 460 of the first cup 428, for example, by welding.

When assembled, the two cups 428, 430 are in the form of a "doughnut" and define two semi-annular conduits between them, going from the opening 429 of the first cup 428 to the opening 472 of the second cup 430.

The gaseous reagent injector 436 is provided to inject into the two semi-annular conduits defined by the two cups 428, 430. To that end, it is fastened on the upper peripheral portion 456 of the peripheral area 452 of the first cup 428, near the opening 429. The injector 436 is oriented substantially at 45° relative to the central line L1 such that the gaseous reagent stream is oriented toward the central protruding area 462 of the second cup 430.

According to one alternative, the injector 436 is oriented such that the injection direction is perpendicular to the two semi-annular conduits.

According to another alternative, the injector 436 is oriented such that the injection direction is parallel to the tangent to two semi-annular conduits, thereby making it possible to obtain a more compact injection portion 418.

The operation of the exhaust line according to the third embodiment described above will now be outlined, in light of FIGS. 11 and 12, in which the exhaust gas stream is shown by arrows.

As before, the exhaust gases arrive on the first cup 428. The gases are collected by the first cup 428 after having passed through the upstream monolith 14.

Then, the exhaust gases penetrate the duct through the opening 429 (FIG. 11).

At the inlet of the duct, the gaseous ammonia is injected and mixes with the exhaust gases during the passage of the exhaust gases in the duct.

Due to the orientation of the injector 436, the gas stream is distributed between the two semi-annular conduits.

The first part of the gas stream thus uses one of the semi-annular conduits and travels along that conduit following a helical movement around the central line of that conduit to the opening 472. The rounded shape of the two cups 428, 430 initiates the rotary movement of that first part of the gas stream, which performs at least one complete revolution, or up to four complete revolutions, around the central line, in a counterclockwise direction in FIG. 12.

During that time, a second part of the gas stream uses the other of the semi-annular conduits and travels along that conduit following a helical movement around the central line of that conduit up to the opening 472. The rounded shape of the two cups 428, 430 initiates the rotary movement of that second part of the gas stream, which performs at least one complete revolution, or up to four complete revolutions, around the central line, in the clockwise direction in FIG. 12.

Once the gases have passed through the opening 472, they will pass through the downstream monolith 16.

Furthermore, as in the preceding cases, a mixer may be integrated inside the duct and/or part of the walls of the duct may include a wire mesh to ensure optimal homogenization of the gases and the ammonia.

The advantage of this embodiment is that it allows excellent mixing of the gases and the ammonia.

The exhaust line according to the invention has the advantage of reducing the distance between the two faces of the successive monoliths while preserving a sufficient length of the path of the gases to ensure homogenization of the gaseous ammonia and the exhaust gases. The path is long enough for the final exhaust gas/ammonia mixture to be as homogenous as possible.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust line for a motor vehicle, comprising:
   an upstream monolith and a downstream monolith to treat exhaust gases passing along an exhaust line, said upstream and downstream monoliths being positioned in series in the exhaust line,
   an injection portion positioned between an upstream face defined by the upstream monolith and a downstream face defined by the downstream monolith and comprising a duct through which a stream of exhaust gas flows, said duct extending from the upstream face to the downstream face, the duct having a central line with a set length between the upstream and downstream faces,
   an injection device comprising a reagent injector mounted on the injection portion and designed to inject reagent in gaseous form into the injection portion, and a store provided to supply the injector with reagent in gaseous form; and
   wherein the injection portion comprises at least one first cup positioned inside the duct in a path of the exhaust gas stream line so that a mean path of the exhaust gas stream line is at least 20% longer than the set length,
   the injection portion includes a second cup positioned inside the duct between the upstream face and the first cup, and
   the injection of the reagent is done between the first cup and the second cup.

2. The exhaust line according to claim 1, wherein the set length is substantially comprised between 40 and 140 mm.

3. The exhaust line according to claim 1, wherein the first cup has a bottom wound in a spiral around the central line of the injection portion.

4. The exhaust line according to claim 3, wherein the bottom of the first cup is wound in a spiral around the central line of the injection portion for performing three quarters of a revolution.

5. The exhaust line according to claim 3, wherein the first cup has an opening at an end of the spiral furthest from the upstream face.

6. The exhaust line according to claim 3, wherein the first cup includes a beak at an end of the spiral furthest from the upstream face.

7. The exhaust line according to claim 6, wherein the beak extends the bottom of the first cup toward the upstream face and toward ab outside of the spiral.

8. The exhaust line according to claim 1, wherein the second cup has a bottom winding in a spiral around the central line of the injection portion.

9. The exhaust line according to claim 8, wherein the second cup has an opening at an end of the spiral furthest from the upstream face.

10. The exhaust line according to claim 8, wherein the second cup has an opening at an end of the spiral closest to the upstream face.

11. The exhaust line according to claim 8, wherein the first and second cups define a spiral-shaped conduit between them, starting from an opening of the second cup and going to an opening of the first cup, extending over at least 180° and having a straight cross-section substantially larger than 2,300 mm².

12. The exhaust line according to claim 9, wherein the opening of the first cup and the opening of the second cup are angularly offset relative to one another around the central line.

13. The exhaust line according to claim 1, wherein the first cup includes a rounded wall having a central area protruding toward the upstream face and a hollow peripheral area turned toward the upstream face surrounding the protruding central area, an opening being formed in the wall of the first cup between the protruding central area and the hollow peripheral area.

14. The exhaust line according to claim 13, wherein the second cup includes a rounded wall having a hollow central area turned toward the upstream face and a peripheral area protruding toward the upstream face surrounding the hollow central area, an opening being formed in the wall of the second cup between the hollow central area and the protruding peripheral area.

15. The exhaust line according to claim 14, wherein the first and second cups are configured to impart a helical movement to the exhaust gases from the opening of the second cup to the opening of the first cup.

16. The exhaust line according to claim 1, wherein the second cup has perforations with a diameter substantially equal to 5 mm or an opening.

17. The exhaust line according to claim 1, wherein the first cup comprises a wire mesh layer over at least part of a surface of the second cup.

18. The exhaust line according to claim 1, wherein the reagent injector is oriented such that an injection direction is perpendicular to the injection portion.

19. The exhaust line according to claim 1, wherein the reagent injector is oriented such that an injection direction is parallel to a tangent to the injection portion.

20. The exhaust line according to claim 1, where the store provides a metered flow of gaseous ammonia to the injector.

21. The exhaust line according to claim 1, wherein the store includes an operational storage reservoir, a first line connecting the operational storage reservoir to the injector, and a metering valve inserted on the first line to meter the reagent in gaseous form.

22. The exhaust line according to claim 21, wherein the operational storage reservoir is equipped with a heater to heat an ammonia storage material located in the operational storage reservoir.

23. The exhaust line according to claim 22, wherein the store includes a buffer reservoir inserted on the first line upstream from the metering valve to regulate gaseous ammonia pressure upstream from the metering valve and gaseous ammonia flow rate injected into the injection portion.

24. The exhaust line according to claim 21, wherein the store includes a primary storage reservoir, a second line connecting the primary storage reservoir to the operational storage reservoir, and a shut-off valve inserted on the second line.

25. The exhaust line according to claim 24, wherein the primary storage reservoir is equipped with a heater to heat an ammonia storage material located in the primary storage reservoir.

26. The exhaust line according to claim 24, wherein the operational storage reservoir is equipped with a first heater to heat an ammonia storage material located in the operational storage reservoir, and wherein the primary storage reservoir is equipped with a second heater to heat an ammonia storage material located in the primary storage reservoir.

27. The exhaust line according to claim 24, wherein the store includes a buffer reservoir inserted on the first line upstream from the metering valve to regulate gaseous ammonia pressure upstream from the metering valve and gaseous ammonia flow rate injected into the injection portion.

28. The exhaust line according to claim 21, wherein the operational reservoir includes a material capable of selectively absorbing or adsorbing gaseous ammonia, and desorbing the gaseous ammonia.

* * * * *